UNITED STATES PATENT OFFICE.

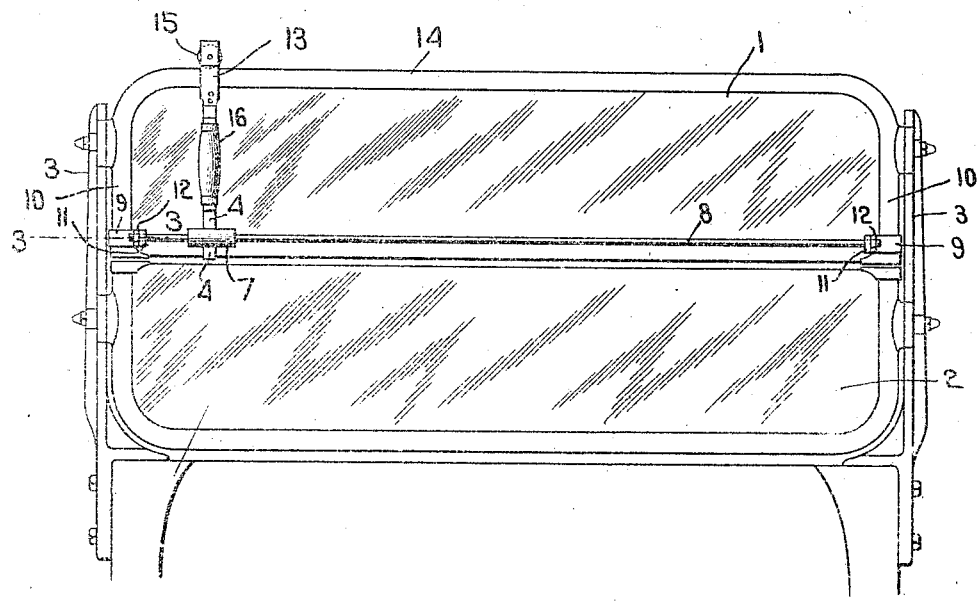
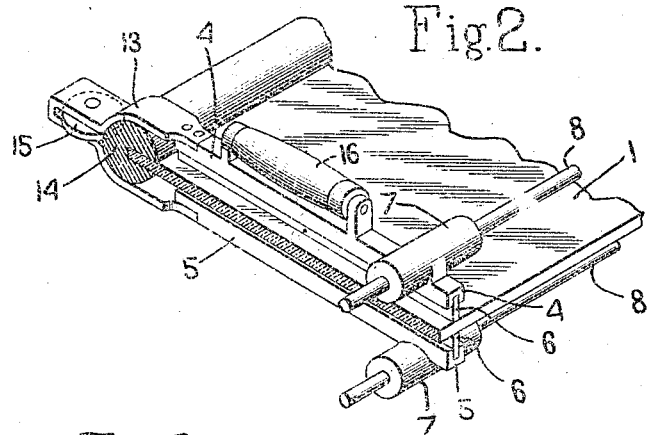
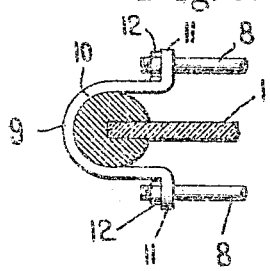

CLARENCE G. WILKINSON, OF MAGNOLIA, MASSACHUSETTS, ASSIGNOR OF ONE-HALF TO HENRY W. BROWN, OF MAGNOLIA, MASSACHUSETTS.

WIND-SHIELD CLEANER.

1,236,800.  Specification of Letters Patent.  Patented Aug. 14, 1917.

Application filed December 8, 1916. Serial No. 135,881.

*To all whom it may concern:*

Be it known that I, CLARENCE G. WILKINSON, a citizen of the United States, residing at Magnolia, county of Essex, State of Massachusetts, have invented an Improvement in Wind-Shield Cleaners, of which the following description, in connection with the accompanying drawing, is a specification, like characters on the drawing representing like parts.

This invention relates to wind shield cleaners and has for its object to provide a novel device by which both sides of a wind shield can be quickly and effectively cleaned when they become clouded by snow or rain.

I will first describe a selected embodiment of my invention and will then point out the novel features in the appended claim.

Figure 1 of the drawings is a view of the wind shield having my improved cleaner applied thereto;

Fig. 2 is a sectional perspective view of a wind shield with my improvements;

Fig. 3 is an enlarged section on the line 3—3, Fig. 1.

I have shown in Fig. 1 a wind shield of ordinary construction comprising the upper and lower sections 1 and 2, both of which are pivotally secured to posts or uprights 3 in usual manner. The embodiment of the invention herein illustrated is constructed to be applied to the upper wind shield section 1, and it comprises two cleaning members, one on either side of the wind shield which are mounted on the wind shield in a novel way and which can be moved from one end to the other of the wind shield, thus cleaning both sides of the upper section 1.

My improved cleaning device comprises the two cleaning elements 4 and 5 situated on opposite sides of the wind shield section 1 and extending from the top to the bottom thereof. These cleaning elements 4 and 5 are each shown as comprising a body portion which carries a felt, rubber or similar yielding face or strip 6 that contacts with the glass. Each cleaning element extends from the top to the bottom of the section 1. These two cleaning elements are connected together and are mounted for bodily movement from one end to the other of the wind shield section 1. Each cleaning element 4 and 5 is provided near its lower end with a guide 7 which embraces and travels on a guide rod 8 that extends from one end to the other of the wind shield. There are two guide rods 8, one on each side of the wind shield section, and said guide rods are rigidly secured to the wind shield section so that they are firmly held in proper position relative thereto to constitute guides for the lower ends of the cleaner elements 4 and 5. These guide rods may be secured to the wind shield section in any suitable way. I have, however, herein shown for this purpose two clips or brackets 9 which embrace and are secured to the sides 10 of the wind shield near the lower ends thereof. Each clip 9 is formed with the outwardly-directed feet 11 to which the guide rods 8 are secured. These guide rods are shown as extending through the feet and as held thereto by nuts 12.

The upper ends of the cleaning elements 4 and 5 are connected together by a connection 13 which encircles the upper edge 14 of the wind shield section 1. This connection 13 is yoke-shaped and has journaled therein an anti-friction roller 15 which rests on the upper edge 14 of the wind shield section 1. This upper edge 14 thus constitutes a track for the roller 15. The cleaning element 4 which is situated on the inside of the wind shield section is provided with a handle 16 by which the cleaner can be moved across the wind shield.

By having the two guide rods 8 for guiding and supporting the lower ends of the two cleaning elements 4 and 5 and the anti-friction roll 15 at the upper end, a cleaning device is provided which can be easily moved across the wind shield and in all positions thereof the flexible cleaning strips or faces 6 will be held in contact with the glass.

The device has the further advantage that it can be readily applied to any wind shield. The device can thus be easily and quickly installed on a wind shield for use during the winter weather and can be removed any time when there is no further use for it.

I claim:

In a wind shield cleaner, the combination with two clips, each adapted to embrace the side of a wind shield near its lower end, of two guide rods connecting said clips, two oppositely-disposed cleaning elements, one for each side of a wind shield, each cleaning element having at its lower end a guiding portion which embraces and slides on one of the guide rods, means connecting the upper ends of the two cleaning elements and adapted to embrace the upper edge of the wind shield, and an anti-friction roller carried by said connecting means and adapted to have rolling contact with said upper edge of the wind shield.

In testimony whereof, I have signed my name to this specification.

CLARENCE G. WILKINSON.